US012262664B2

(12) United States Patent
Biancardi

(10) Patent No.: US 12,262,664 B2
(45) Date of Patent: Apr. 1, 2025

(54) AUTOMATIC VEGETATION WATERING APPARATUS AND METHOD

(71) Applicant: Robert P. Biancardi, Merrillville, IN (US)

(72) Inventor: Robert P. Biancardi, Merrillville, IN (US)

( * ) Notice: Subject to any disclaimer, the term of this patent is extended or adjusted under 35 U.S.C. 154(b) by 279 days.

(21) Appl. No.: 17/887,999

(22) Filed: Aug. 31, 2022

(65) Prior Publication Data

US 2024/0065189 A1 Feb. 29, 2024

(51) Int. Cl.
*A01G 27/00* (2006.01)
*F25B 21/02* (2006.01)

(52) U.S. Cl.
CPC ......... *A01G 27/003* (2013.01); *A01G 27/001* (2013.01); *A01G 27/008* (2013.01); *F25B 21/02* (2013.01); *F25B 2321/0212* (2013.01)

(58) Field of Classification Search
CPC .......... F25B 2321/021; F25B 2321/023; F25B 21/02; A01G 27/003; A01G 27/006; A01G 27/008; A01G 27/001
USPC ........................................................... 62/3.4
See application file for complete search history.

(56) References Cited

U.S. PATENT DOCUMENTS

| 4,315,599 | A | | 2/1982 | Biancardi | |
|---|---|---|---|---|---|
| 5,601,236 | A | * | 2/1997 | Wold | A01G 29/00 239/69 |
| 6,581,849 | B2 | * | 6/2003 | Zhang | A01G 25/167 239/128 |
| 2019/0343054 | A1 | * | 11/2019 | Ayres | F25B 21/02 |
| 2023/0111690 | A1 | * | 4/2023 | Stewart | B01D 53/265 62/285 |

* cited by examiner

*Primary Examiner* — John F Pettitt, III
(74) *Attorney, Agent, or Firm* — Greer, Burns & Crain, Ltd.

(57) ABSTRACT

An automatic plant watering device includes a thermoelectric module with a cold face that can be energized to drop its temperature below 32 degrees F. A condensation member is thermally connected to the cold face and has a wall exposed to ambient air for water vapor to condense on and freeze when the module is energized. A water collection chamber positioned below the exposed wall is configured to hold collected melt water from the exposed wall until a collected melt water temperature has risen above 32° F. A moisture sensor is used to initiate a chilling cycle controlled by a controller to energize the thermoelectric module for a period of time in excess of an hour to cause a build-up of frost on the exposed wall and thereafter to deenergize the thermoelectric module to permit the temperature of the exposed wall to rise above 32 degrees F.

19 Claims, 6 Drawing Sheets

AUTOMATIC VEGETATION WATERING APPARATUS AND METHOD

FIELD OF THE INVENTION

This invention relates to an apparatus and method for automatically watering vegetation by condensing water humidity out of the atmosphere.

BACKGROUND OF THE INVENTION

Methods of watering vegetation in common usage are quite varied, however all require one common element, a supply of liquid water. The actual means used to transport the liquid water from its source to the location of the vegetation ranges from manually carried buckets or watering cans to elaborate automated piped sprinkling systems.

An apparatus and method for automatically watering vegetation is disclosed in applicant's earlier U.S. Pat. No. 4,315,599, which is incorporated herein by reference, in its entirety. The device disclosed in that patent, in practice, turned out to be undersized and underpowered, and therefore provided insufficient liquid water for a typical house plant.

SUMMARY OF THE INVENTION

The present invention provides for an improvement over the existing art in that it provides for an automatic vegetation watering method and apparatus for indoor use, which does not require a source of liquid water and which does not require elaborate liquid water transporting apparatus. The device provides increased cooling capacity, greater water collection and more consistent watering distribution than existing devices. Further, the device is small, portable, low cost and requires only a small amount of energy to operate.

In accordance with the principles of the invention, one embodiment of the invention comprises a method whereby the water requirement of the vegetation is continuously monitored by measuring a moisture content of the soil in the area of the vegetation. If the vegetation requires watering, the temperature of a condensation member is lowered to below freezing (32 degrees F., 0 degrees C.), which would, in all cases, be below ambient dew point temperature causing water vapor in the air surrounding the condensation member to condense and freeze on the condensation member. This frost continues to build up on the condensation member for a time period typically measured in hours, but always more than one hour. It is not necessary, or desirable, to direct a flow of air towards or over the condensation member, but rather only normal air movement around the condensation member will allow the moisture in the air to condense and freeze on the condensation member, without requiring an excessive amount of heat in the room to be removed, which would otherwise be the case if a flow of air was to be directed over the condensation member, such as by a fan directing air towards the condensation member.

After a predetermined time, or after a predetermined build-up of frost has accumulated, the temperature of the condensation member will be allowed to rise above freezing, allowing the collected frost to melt and drip into a collection container. The temperature of the water in the collection chamber may be monitored, and when it rises, for example, above 60 degrees F. (15.5 degrees C.), a solenoid is energized to open an outlet allowing the collected water in the collection chamber to drip by gravity onto the soil surrounding the vegetation. If the subsequent detected soil moisture indicates that additional moisture is required, the temperature of the condensation member is again lowered to below freezing and the cycle repeats. If the subsequent detected soil moisture indicates that no additional moisture is required, the operation is terminated until later testing of the soil moisture indicates that additional moisture is required.

Another embodiment of the invention comprises an apparatus or device comprised of a power supply source connected via electrical circuitry to one or more thermoelectric modules which have the capacity to produce a thermally hot side and a thermally cold side when supplied with electrical current. A condensation member is connected to the cold side of each thermoelectric module via a heat transfer member so as to permit the condensation member to achieve a temperature below 32 degrees F. (0 degrees C.). Frost forms on the condensation member, collecting thereon for a selected time period, typically measured in hours, or until a desired amount or thickness of frost has accumulated. Further, means for detecting vegetation moisture requirements such as an electrical probe placed in the soil surrounding the vegetation and connected by electrical circuitry to the circuit containing the power supply source and thermoelectric module may be used. The probe and accompanying circuitry may act as a switch whereby when the soil is dry, current is allowed to flow from the power supply source to the thermoelectric module, thus causing water vapor to condense and freeze on the condensation member. A water collection receptacle is positioned below the condensation member so that melting frost will drip into the water collection receptacle after the thermoelectric modules are turned off. The water collected in the water collection receptacle will be retained there for a sufficient time for the temperature of the water to rise to ambient temperature or some other predetermined temperature elevated above freezing. A temperature sensor or timer may be employed to make this determination. Once the collected water has warmed up to the determined temperature, an electrically controlled valve will open, allowing the collected water to drip onto the soil surrounding the vegetation.

Various attachments may be provided to be placed gravitationally below the dripping point of the condensation member, such attachments to be used for distributing the drops condensed and holding fertilizer to be carried by the drops into the soil surrounding the vegetation.

DETAILED DESCRIPTION OF THE PREFERRED EMBODIMENTS

It has been determined that for watering individual indoor plants, such as contained in a single pot having a diameter of between 4 and 20 inches (10 to 51 cm), it is generally required to provide up to about 2-4 ounces (60 to 120 ml) of water per day to maintain a proper moisture level for the plant. Typically, such indoor plants are present in an ambient environment referred to as a human comfort zone of between 70 to 82 degrees F. (21-28 degrees C.) and a relative humidity of between 40 to 60%.

For this typical ambient environment, it has been determined that a chilling surface area of between 80 and 160 square inches (516 to 1032 square centimeters), and preferably about (+/−10%) 120 square inches (774 square centimeters), will be sufficient, when provided with a cooling apparatus that will cool and maintain such a surface area to a temperature below freezing.

While different environments, or different plant container sizes will require different sizing of the chilling surfaces or different numbers of individual chilling devices, for the present disclosure, an apparatus sized to provide up to about 2-4 ounces (60 to 120 ml) of collected water per day in such a typical indoor ambient environment maintained in the human comfort zone will be described. The principles of the present invention disclosed for this particular embodiment can be utilized in differently sized devices without parting from the principles of the disclosed invention.

Figure 1:
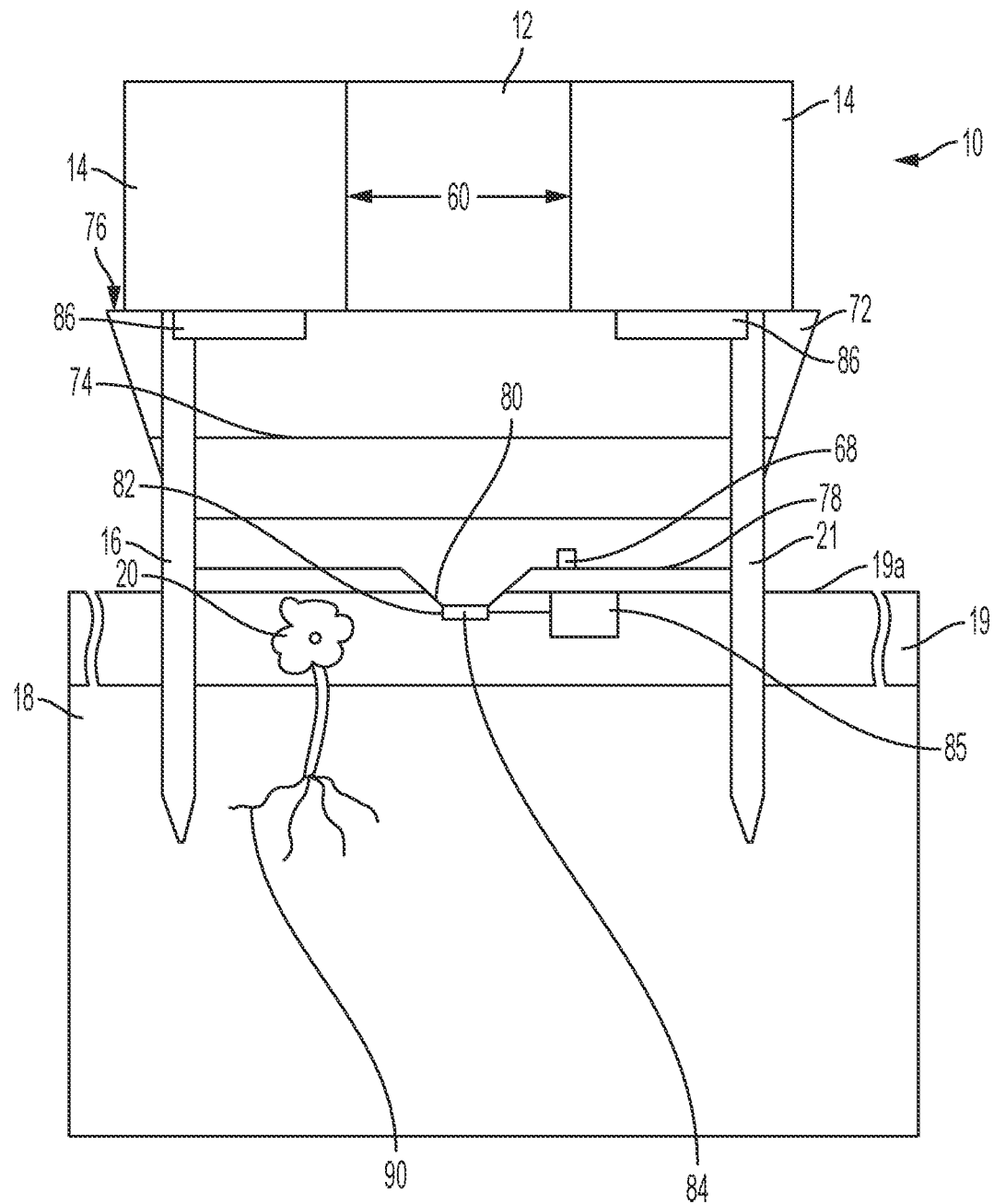
FIG. 1 is a schematic front view of the apparatus for automatically watering vegetation in an operating position.
Figure 2:
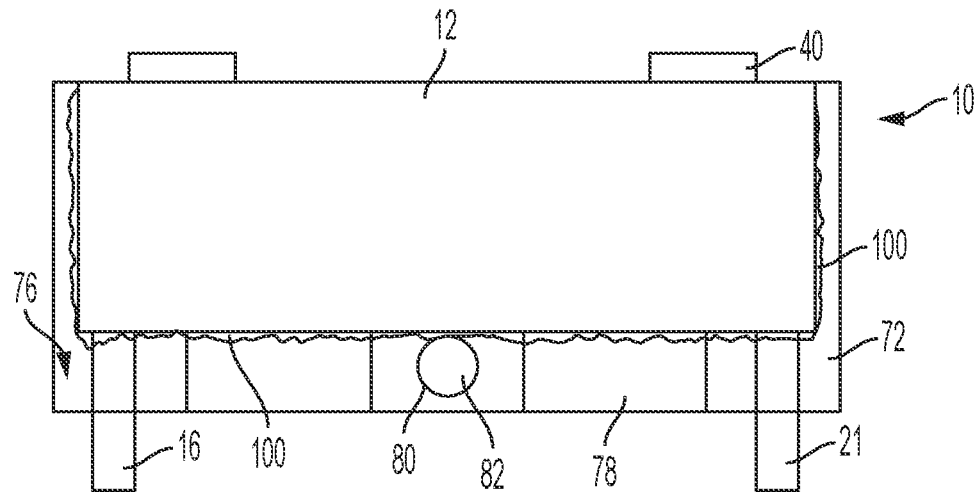
FIG. 2 is a schematic top view of the apparatus of FIG. 1.
Figure 3:
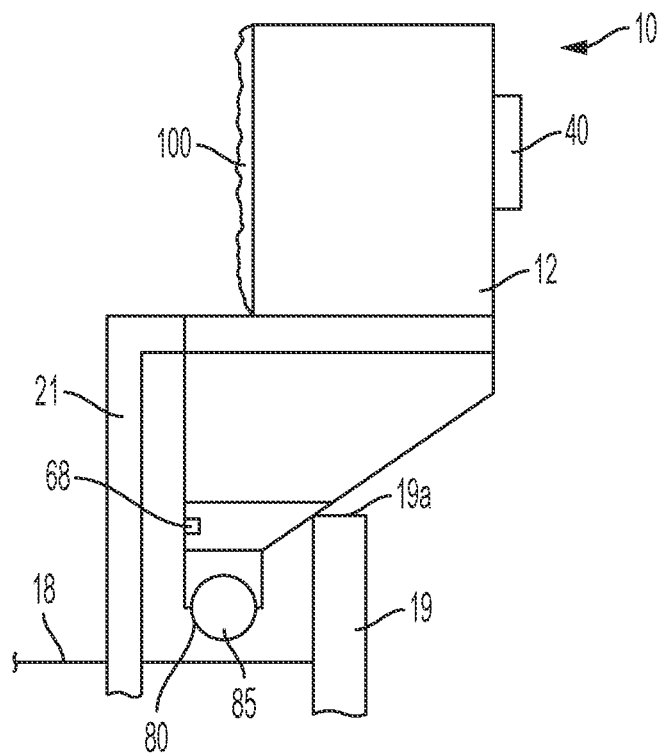
FIG. 3 is a schematic side view of the apparatus of FIG. 1.
Figure 4:
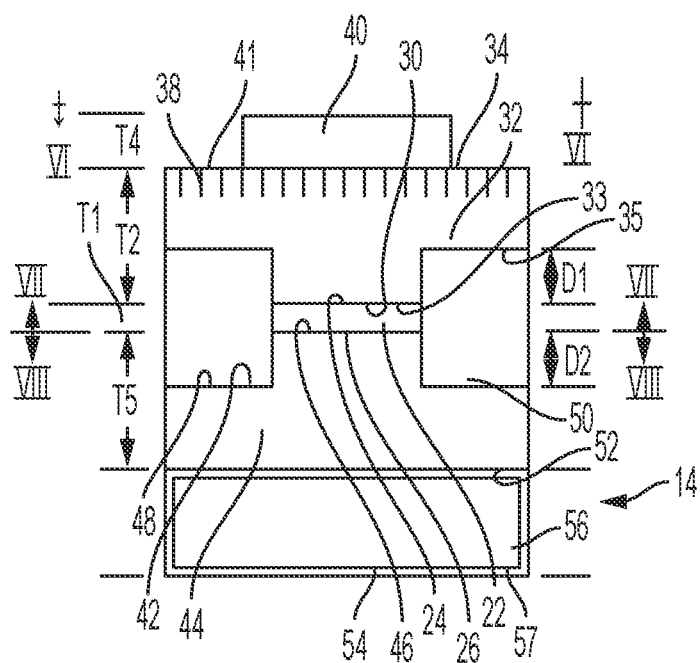
FIG. 4 is a top view of a single condensation member of the apparatus shown in FIG. 1.
Figure 5:
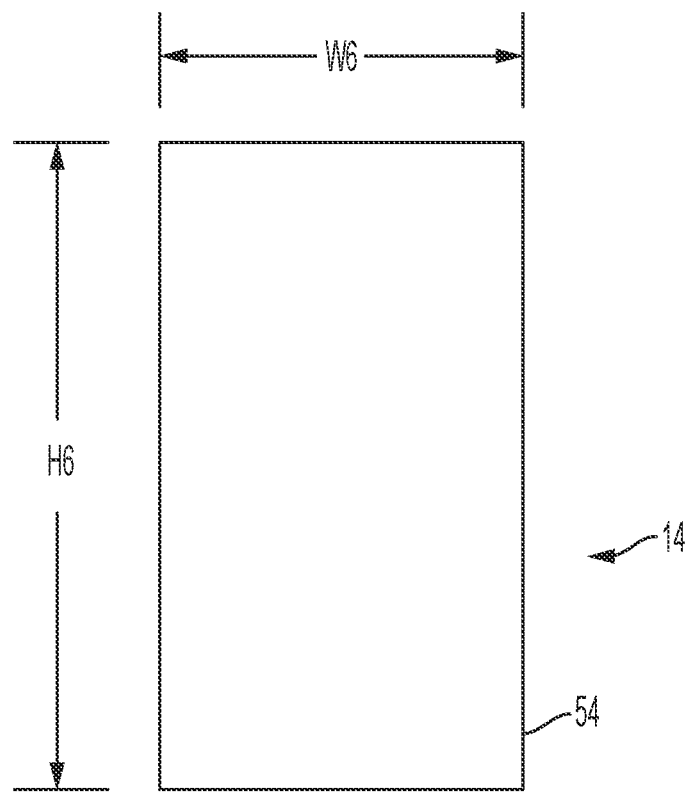
FIG. 5 is a front elevational view of the single condensation member of FIG. 4.
Figure 6:
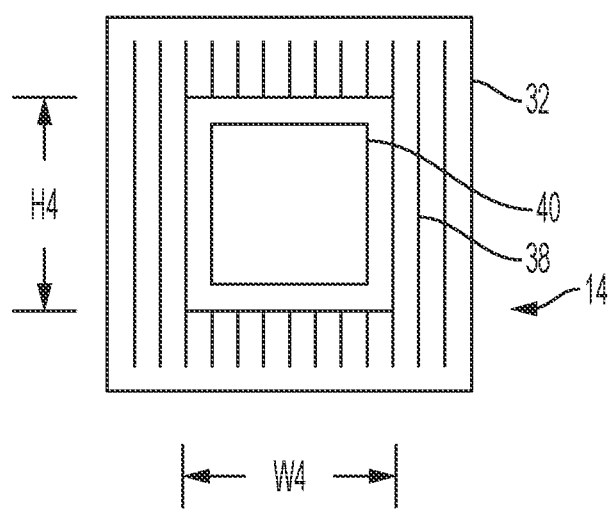
FIG. 6 is a rear elevational view of the condensation member taken along the line VI-VI of FIG. 4.
Figure 7:
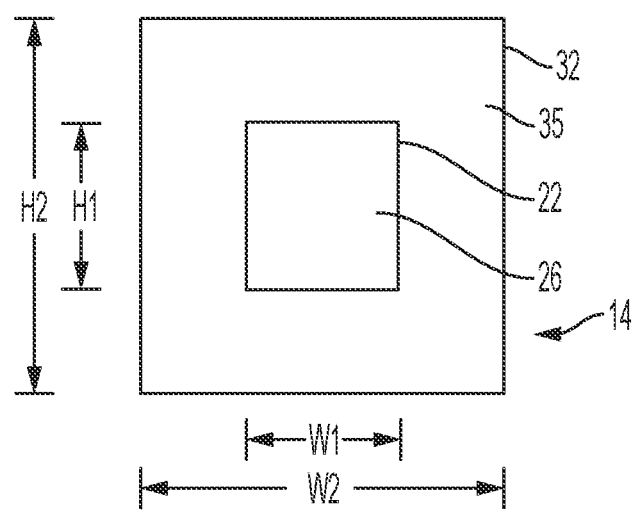
FIG. 7 is a sectional view of the condensation member taken along the line VII-VII of FIG. 4.

In FIGS. 1, 2 and 3, an apparatus 10 for automatically watering vegetation is schematically shown in its operating position. The apparatus 10 is comprised of a housing 12, a pair of spaced apart condensation members 14 and an electrical probe 16. The probe 16 is inserted into soil 18 containing plants or other vegetation 20, such that the condensation member 14 is positioned gravitationally above the soil 18. The soil 18 and vegetation 20 may be contained in a pot 19 or other suitable container. The probe 16 may also be used to help support the apparatus 10 on the pot 19 in combination with a second non-functional probe 21 which may simply be a metal or plastic rod. The apparatus 10 may also rest on a top edge or rim 19a of the pot 19 as shown in FIG. 3, if desired. Various configurations may be provided for the housing 12 to assist in seating the apparatus 10 on the pot 19.

FIGS. 4-8 show a single condensation member 14 in isolation in more detail. In these views it is seen that the condensation member 14 is comprised of a thermoelectric module 22, such as a Peltier crystal, which is capable of producing a hot face 24 and a cold face 26 when supplied with electrical current. For example, it has been found that a thermoelectric module or thermoelectric cooler that is useful in this embodiment could be one manufactured by Laird Thermal Systems as model number CP12-161-06-L1-EP-W12. This particular thermoelectric module 22 has opposed hot 24 and cold 26 faces having a height H1 of approximately 40 mm (1.575 inches) and a width W1 of approximately 40 mm (1.575 inches) with a thickness T1 of approximately 3.6 mm (0.142 inches). The thermoelectric module 22 may be driven by a 12 V power supply 28 (FIG. 9), and will draw a current of about 3.15 amperes to produce about 38 watts of cooling power and achieving a maximum temperature difference of at least 54 degrees F. (30 degrees C.) between the two faces 24, 26. As such, the cold face 26 will achieve a temperature well below the freezing temperature of water when the apparatus 10 is placed in the human comfort zone environment.

Attached to the hot face 24 is a front face 30 of a first solid aluminum block heat sink 32 having a height H2 of approximately 3.5 inches (90 mm) and a width W2 of approximately 3.5 inches (90 mm), with a thickness T2 of approximately 1 inch (25 mm), to draw heat from the hot face 24 to a larger surface area for cooling. While the exact size of the first solid aluminum block heat sink 32 is not critical, it is useful that this heat sink be larger than the hot face 24 so as to begin spreading out the elevated temperature of the hot face to a larger area and volume so that the heat of the hot face 24 can be dissipated. Whenever, herein, reference is made to a component being made of aluminum, a different material may be substituted, so long as that substitute material is highly heat conductive.

The first solid aluminum block heat sink 32 may have its front face 30 contoured such that a 40 mm (1.574 inches)×40 mm (1.574 inches) contact area 33 (the same dimensions as area H1 by W1) protrudes from the front face 30 which is to be in direct contact with the hot face 24 of the thermoelectric module 22. An area 35 surrounding this contact area 33 is recessed away from the contact area 33, such as by a distance D1 of 0.5 inches (12.7 mm) to form an insulating space as described below.

A back side 34 of the first solid aluminum block heat sink 32 may have a finned heat sink region 38 formed thereon to further increase the cooling surface area. The exact size of the finned heat sink region 38 is not critical, but it is useful if the height and width of this finned heat sink region 38 are at least nearly as large, if not as large as, the height and width of the first solid aluminum block heat sink 32. Since the hot face 24 of the thermoelectric module 22 has an area of 16 square centimeters (2.48 square inches), it is useful if the finned heat sink region has a total surface area of at least double that size.

An air moving device 40, such as a fan, may be attached to a back side 41 of the finned heat sink region 38 to cause a flow of air to move over and through the fined heat sink region, to dissipate heat from the finned heat sink region. For example, a fan 40 driven by a brushless DC motor operating at 12 V DC, such as manufactured by Nidec Copal Electronics, series F410C, has a height H4 of approximately 40 mm (1.575 inches) and a width W4 of approximately 40 mm (1.575 inches), with a thickness T4 of approximately 20 mm (787 inches), and will provide a 3.9 cubic foot (110.4 liters) per minute flow rate through and over the finned heat sink region 38.

A back 42 face of a second solid aluminum block heat sink 44 may be attached to the cold face 26 of the thermoelectric module 22. This second solid aluminum block heat sink 44 which acts as a heat transfer member, may have its back face 42 contoured such that a 40 mm (1.574 inches)×40 mm (1.574 inches) contact area 46 (the same dimensions as area H1 by W1) protrudes from the back face 42 which is to be in direct contact with the cold face 26 of the thermoelectric module 22. An area 48 surrounding this contact area 46 is recessed away from the contact area 46, such as by a distance D2 of 0.5 inches (12.7 mm), so that an insulation material 50 (such as closed cell foam neoprene rubber, Styrofoam, or other similar material) may be placed between the first 32 and second 44 solid aluminum block heat sinks, between areas 35 and 48, to prevent or greatly reduce a flow of heat directly from the first solid aluminum block heat sink 32 to the second solid aluminum block heat sink 44. The second solid aluminum block heat sink 44 may have a height H5 of approximately 3.5 inches (90 mm) and a width W5 of approximately 3.5 inches (90 mm), with a thickness T5 of 1 inch (25.4 mm) While the exact size of the second solid aluminum block heat sink 44 is not critical, it is useful that this heat sink be larger than the cold face 26 so as to begin increasing the surface area that will be cooled by the cold face 26.

Attached to a front face 52 of the second solid aluminum block heat sink 44 is a chilling container 54 which is a hollow container configured to hold a liquid antifreeze refrigerant 56. The liquid antifreeze refrigerant 56 can be any liquid, such as a mixture of 10% automotive coolant refrigerant and 90% water, that will remain in the liquid phase at 1 atmosphere (1 bar) pressure down to a temperature of no more than about −20 degrees F. (−29 degrees C.). The hollow chilling container 54 may have a height H6 of 7 inches (17.8 cm), a width W6 of 4 inches (10.2 cm) and a thickness T6 of ¾ inches (19 mm), with walls 57 that are 0.1 inches (2.5 mm) thick, and therefore will hold a volume of approximately 11.5 ounces (340 ml) of liquid. With such a dimensioned chilling container 54, the exposed chilled surface area of the chilling container will be about 45 square inches (290 square cm). An exposed surface area of the second solid aluminum block heat sink 44, will provide about an additional 15 square inches (97 square cm) of chilled surface area for moisture to condense on as well. Thus, the total chilled surface area is just around 60 square inches (387 square cm) for each condensation member 14 with the exemplary device of the size.

As shown in FIG. 1, the apparatus 10, in this embodiment, is comprised of two condensation members 14, which may be constructed identically to one another and powered in parallel, in order to double the chilled surface area available for condensation of ambient moisture to about 120 square inches (774 square cm). In other embodiments, the condensation member 14 and/or its various components, may have different dimensions, and in such different embodiments, the apparatus 10 may be comprised of only a single condensation member 14, or more than two condensation members 14. It is preferred that multiple smaller condensation members be used instead of a single large member in order to limit the surface area to be chilled by each thermoelectric module. Too large of a surface area will prevent the surface from being chilled below freezing or will require too high of an electrical current. Of course, power requirements for operating more than two condensation members 14 will increase, and separate additional power supplies may need to be used with more than two condensation members being operated in parallel.

In the preferred embodiment, the two condensation members 14 are spaced from one another in the housing 12, and a controller 58 (FIG. 9) may occupy all or part of a space 60 (FIG. 1) between the two condensation members 14. The controller 58 may be a digital controller, such as a microprocessor 62, and the control functions may be incorporated into a memory 64 accessible by the microprocessor 62 in response to inputs from one or more manually operated switches 66, various sensors 68, 77, 106, 108, the electrical probe 16, a clock or timer 70, or other components In a preferred embodiment, the condensation members 14 are positioned vertically above a collection chamber 72 (FIGS. 1-3) which will collect liquid condensation 74 from the condensation members 14, as described in further detail below. The collection chamber 72 will be sufficiently large so as to have a top opening 76 large enough to capture all of the condensation 74 which will be dripping from the condensation members 14 and second heat sink 44 and to hold all of the condensation collected during a single cooling cycle, such as between 2 and 4 ounces (59 ml to 118 ml) of water. In other embodiments, the collection chamber 72 may be larger or smaller.

A bottom wall 78 of the collection chamber 72 is preferably sloped towards a lowermost point 80 which includes an opening 82 closable by an electrically operated valve 84, such as by a solenoid 85. In some embodiments, more than one opening 82 may be provided to dispense the collected melt water 74 over a larger area of the soil 18.

Optionally, positioned between the condensation members 14 and the bottom wall 78 of the collection chamber 72 are one or more additive containers 86, located in a path of the condensation 74 which will be dripping from the condensation members 14 into the collection chamber 72. The additive containers 86 are configured to receive plant food, fertilizer, or other additives to be delivered to the soil 18 in the pot 19. Alternatively, the additive container(s) may be provided below the opening(s) 82 of the collection chamber 72.

The housing 12 may be configured to be held on a rim or lip 19a of the pot 19 such that the condensation members 14, and the collection chamber 72, if present, are positioned over the soil 18 in the pot 19. Other attachments may be provided to dispense the melt water 74 being dispensed by the collection chamber 72 over a larger area.

An exemplary method of operation of the apparatus 10 is as follows:

Initially, the apparatus may be positioned on the pot 19, or at least above the soil 18 in the pot so that the condensation members 14, and the opening 82, in the bottom wall 78 of the collection chamber 72, if present, are positioned above the soil 18.

The controller 58 may be configured to operate a particular operating program, and various inputs may be manually provided by the user, such as plant size or moisture requirements, or other operating parameters.

The moisture probe 16 may be inserted into the soil 18 proximate to roots 90 of the vegetation 20. The probe 16 may have a single extending element with differing metals therein which results in a current of electrons flowing between the metals when they are placed in a conducing environment, such as moist soil. Thus, no power is required to be provided to the probe 16, and the output of the probe will continuously provide an indicating signal scaled to the moisture level in the soil due to the level of current flowing between the two metals. This indicating signal may be sampled by the controller 58 at appropriate times to determine whether a chilling phase of the water producing cycle should begin.

The user may initiate the water producing cycle by manually operating the power switch 66 of the controller 58.

Once the power switch 66 has been closed, the moisture probe 16 will provide an input to the controller 58 regarding the level of moisture in the soil 18. If the level of moisture detected is below the desired moisture level, power will be supplied to the two thermoelectric modules 22 which will cause a temperature of the cold faces 26 to drop, which temperature drop will be transmitted through the second solid aluminum heat sink block 44 to the chilling container 54. The liquid refrigerant 56 in the chilling container 54 will assure that a temperature of all of the walls 57 of the chilling container 54 will drop as well. At the same time, the fans 40 will be powered, thus providing air movement over the finned heat sink region 38.

With the specific thermoelectric modules 22 described above, and the sizes of the various components as also described, the temperature of the walls 98 of the chilling container 54 will drop below the freezing temperature of water. At this reduced temperature, moisture in the ambient air surrounding the chilling container 54 will first condense on the outside of the walls 57 of the chilling container, and the exposed surfaces of the second solid aluminum block heat sink 44, and then will freeze on those walls 57 and surface, and additional moisture will continue to condense and freeze, producing a layer of frost 100 on the exterior of the chilling container 54 and exposed surfaces of the second solid aluminum block heat sink 44.

Although no air moving devices are used to provide a flow of air over the exterior of the chilling container 54, the heat sink fans 40 will be energized at the same time that the thermoelectric modules 22 are energized, so that heat flowing into the finned heat sink region 38 will be conducted into the ambient air, and the ambient air will be mixed by the fans 40, providing a sufficient movement of air in a typical room of a house or office to provide a continuous supply of ambient moisture to the exterior of the chilling container 54.

The chilling of the chilling container 54 will continue for a chilling time period as determined by the controller 58, the time period typically measured in hours, building up a substantial layer of frost 100 on the chilling container 54. This layer of frost may be in the range of ½ to ⅜ inches (12.7 to 9.5 mm) thick, or more, although thicknesses greater than about ⅜ths of an inch (9.5 mm) produce diminishing returns, in terms of volume of water per unit of additional time.

The running of the thermoelectric modules 22 may be controlled by a timer or clock, so as to provide a running time that has been determined to produce the desired thickness of the frost layer. This time period had been determined to be well in excess of an hour, and for the environmental conditions described above, generally ranges between 2 and 6 hours of running time to develop a sufficiently thick frost layer. Other arrangements could be provided to measure the thickness of the frost layer, including a laser measuring device 77 or other sensing device that could measure the thickness of the frost layer. Termination of the chilling period could be effected when the laser measuring device 77 or other sensor detects that a predetermined thickness has been achieved.

At the end of the chilling time period, power will be removed from the thermoelectric modules 22 and the fans 40, and the temperature of the chilling container 54 will begin to rise towards ambient room temperature. As the temperature of the chilling container 54 and the layer of frost 100 thereon reaches 32 degrees F. (0 degrees C.), the frost 100 will begin to melt and the melt will drip as liquid water 74 into the collection chamber 72. This melt water 74 will initially have a temperature slightly above freezing, which generally is too cold to be beneficially supplied to the vegetation 20. Therefore, the melt water 74 will preferably collect in the collection chamber 72 until a temperature sensor 68 in the collection chamber 72 has detected that the water temperature has reached ambient room temperature, or at least has exceeded a predetermined temperature above 32 degrees F. (0 degrees C.), but below ambient temperature. For example, a temperature of at least 60 degrees F. (15.5 degrees C.) would be acceptable for being applied to the soil 18. Alternatively, a clock or timer could be used to allow for a sufficient time to pass, such as an hour, to allow the temperature of the collected melt water 74 to approach ambient room temperature or at least rise sufficiently above freezing.

Once the temperature of the melt water 74 in the collection chamber 72 has reached the appropriate temperature, the valve 84 is operated by the controller 58 to open the opening 82 in the bottom wall 78 of the collection chamber 72 to allow the water 74 collected in the collection chamber 72 to drip downwardly onto the soil 18 surrounding the vegetation 20.

This dripping of the melt water 74 onto the soil 18 completes a single water collecting cycle of the automatic watering apparatus 10.

A predetermined time after the collected melt water 74 has dripped onto the soil 18, such as 30 minutes, allowing the water to be absorbed into the soil around the roots 90 of the vegetation 20, the controller 58 will query the signal from the sensor probe 16 again to detect whether additional moisture is required in the soil 18 and the cycle will be repeated. If not, the thermoelectric modules 22 are not reenergized, and the controller will periodically check the signal from the moisture probe 16 to determine when additional moisture is needed. When this occurs, a new water collecting cycle will begin of energizing the thermoelectric modules 22 and the fans 40, as described above.

Figure 8:
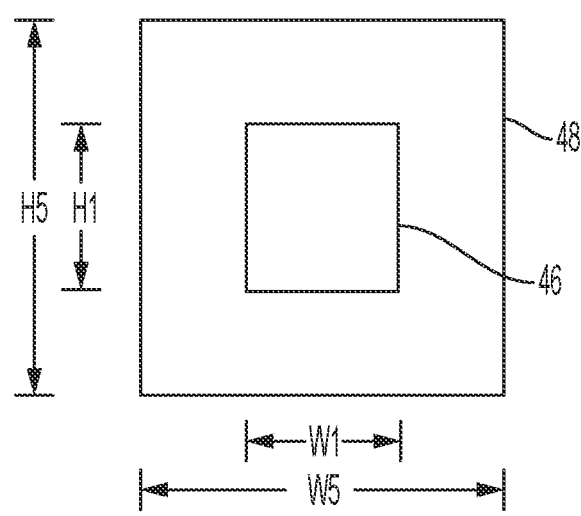
FIG. 8 is a sectional view of the condensation member taken along the line VIII-VIII of FIG. 2.
Figure 9:
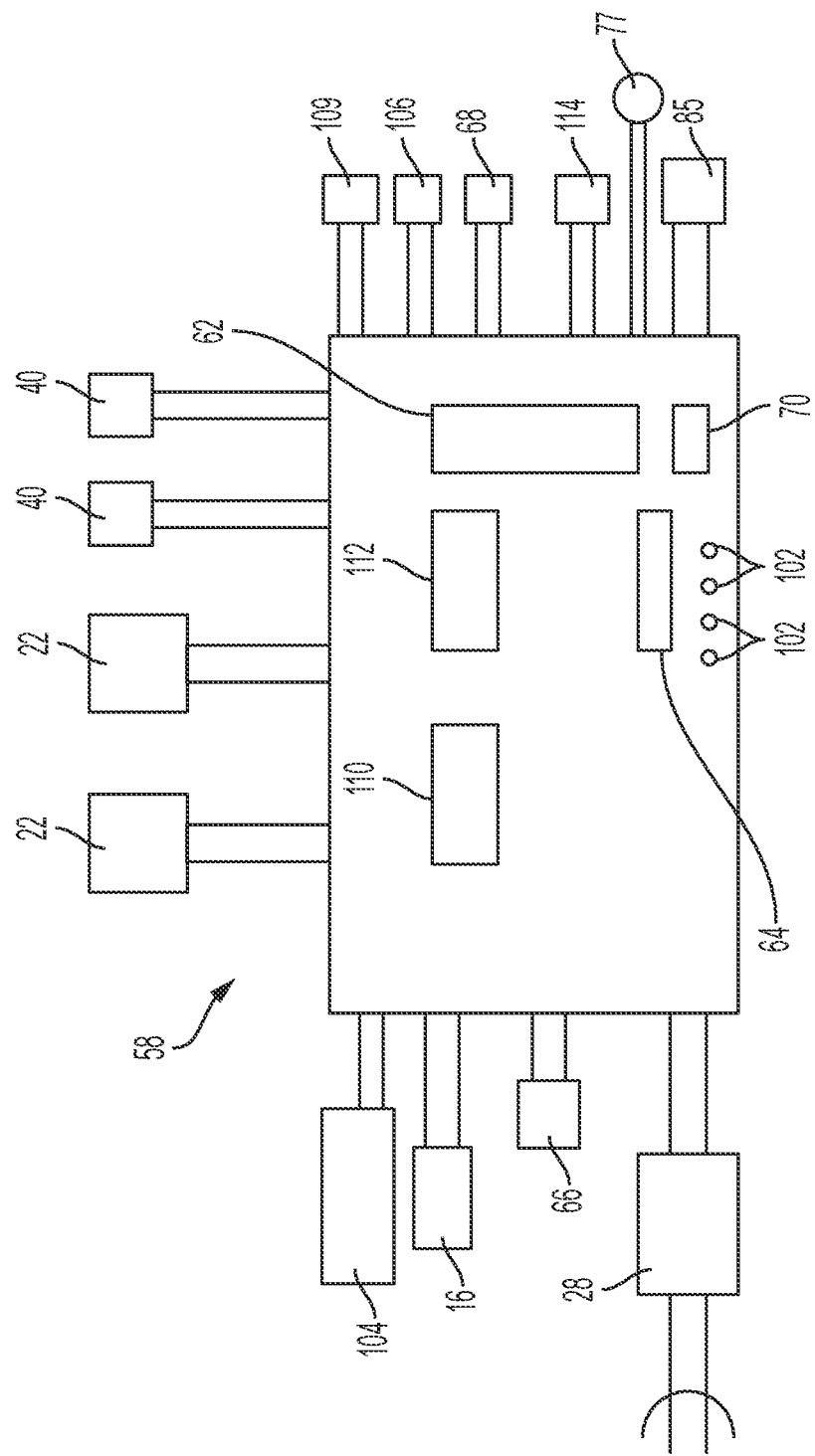
FIG. 9 is a schematic drawing of the electrical circuitry used in the apparatus.

The electrical circuitry which may be used in operating the apparatus is shown in FIG. 8. As seen in the Figure, a 12-volt power source 28 is shown as a rectified or transformed alternating current source or it may be a direct current power source supplied by solar cells or other renewable energy system, or any other type of available electrical current. The manual switch 66 is provided for activating the apparatus 10. One or more indicator lights 102 may be provided to show when a sufficient power supply is available and the switch 66 is in the closed position (green light, for example), as well as other conditions, such as the particular phase the apparatus 10 is in, in particular, the chilling (frost build up) phase (white light for example), the frost melting phase (red light for example) or the release of melt water 74 from the collection chamber 72 phase (blue light for example). Each of the indicator lights 102 may have a color different from those suggested above to signify the different phases being indicated. Various inputs to the microprocessor 62 include the probes 16, a keypad 104 or other controller input device to allow a user to input values for various variables, such as plant size or desired soil moisture level, cycle time, etc. Additional possible inputs may include a sensor 106 such as a thermistor for sensing a temperature of the cold face 26 of the thermoelectric module 22 (to check that the cold face is below freezing), and the sensor 68, such as a thermistor for sensing a temperature of the melt water 74 in the collection chamber 72, and a relative humidity sensor 109 for detecting a relative humidity of the ambient air surrounding the apparatus 10.

The microprocessor 62 may also be connected to control various output elements, including the two thermoelectric modules 22 through single pole double throw switches 110 operating the thermoelectric modules 22 in parallel, the two fans 40 through single pole double throw switches 112 operating the fans 40 in parallel, one or more indicating lights 102, which may be LEDs, and an alarm device 114. The alarm device 114, which may be an audible device, such as a horn or buzzer, or a visible device, such as a light, or both, may be included to provide the user with an indication of when the sensed relative humidity is too low for the apparatus to be able to generate a sufficient amount of melt water 74 in a given time period, such as a day, to meet the soil moisture needs as input by the user via the keypad 104 or other input device. This will alert the user that supplemental watering of the vegetation will be required. The alarm device 114 may also be used to provide other warnings to the user, such as the cold face 26 not dropping below freezing during the frost collecting portion of the cycle.

The circuitry shown in representative of the type of circuitry which can be used to operate the apparatus in accordance with the principles of the invention. It should be understood that operational amplifier circuitry or micro processors may be used instead of the specific components named herein in a manner consistent with the principles of the invention to produce the advantageous function and result of the circuit shown to illustrate the invention.

The systems and devices described herein may include a controller or a computing device comprising a processing unit and a memory which has stored therein computer-executable instructions for implementing the processes described herein. The processing unit may comprise any suitable devices configured to cause a series of steps to be performed so as to implement the method such that instructions, when executed by the computing device or other programmable apparatus, may cause the functions/acts/steps specified in the methods described herein to be executed. The processing unit may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory may be any suitable known or other machine-readable storage medium. The memory may comprise non-transitory computer readable storage medium such as, for example, but not limited to, an electronic, magnetic, optical, electromagnetic, infrared, or semiconductor system, apparatus, or device, or any suitable combination of the foregoing. The memory may include a suitable combination of any type of computer memory that is located either internally or externally to the device such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. The memory may comprise any storage means (e.g., devices) suitable for retrievably storing the computer-executable instructions executable by processing unit.

The methods and systems described herein may be implemented in a high-level procedural or object-oriented programming or scripting language, or a combination thereof, to communicate with or assist in the operation of the controller or computing device. Alternatively, the methods and systems described herein may be implemented in assembly or machine language. The language may be a compiled or interpreted language. Program code for implementing the methods and systems for detecting skew in a wing slat of an aircraft described herein may be stored on the storage media or the device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein.

Computer-executable instructions may be in many forms, including program modules, executed by one or more computers or other devices. Generally, program modules include routines, programs, objects, components, data structures, etc., that perform particular tasks or implement particular abstract data types. Typically, the functionality of the program modules may be combined or distributed as desired in various embodiments.

In accordance with the principles of the invention, the method of automatically watering vegetation is described in the following steps. The water requirement of the vegetation, as input into or preprogrammed in the controller 58 is continuously or periodically monitored by the soil probes 16, to determine whether the vegetation needs additional water. If it is determined that the vegetation does require additional water, the switching circuit is turned on and current flows through the thermoelectric modules 22. This produces a cold side on the thermoelectric modules 22 which reduces the temperature of the condensation member 14 to below that of the freezing point of water.

As this happens, water vapor condenses out of the ambient atmosphere onto the condensation member 14 and freezes thereon. This portion of the cycle continues for a period of time in excess of an hour in order to achieve a thick coating of frost 100 on the condensation member 14. At the end of the chilling portion of the cycle, the thermoelectric modules 22 and the fans 40 are deenergized, and the frost 100 is permitted to melt as the temperature of the condensation member 14 increases toward ambient room temperature.

The melted condensation water 74 is then harvested from the surface of the condensation member 14 at the collection chamber 72 by gravitational means. The condensation member is positioned above the collection chamber, and the melted water 74 remains in the collection chamber 72 until the temperature of the melted water 74 has increased to a level that is safe to apply to the soil 18 of the vegetation 20. This completes a single water collection cycle.

The controller 58 may allow the user to simply input a selected one of a range of operating cycles, such as low water output, medium water output and high water output. The controller 58 may they be programmed to simply operate on a timed basis, such as two hours on for the thermoelectric module(s) 22 and 10 hours off, before repeating, for a low water output cycle, 4 hours on and 8 hours off for a medium water output cycle, and 6 hours on and 6 hours off for a high water output cycle, as an example. Different lengths of on time and off time could of course be selected for various potential cycles, but it is important that each on time period be greater than an hour in order to allow a sufficient minimum amount of frost to build up on the chilling container 54.

By election of the user, plant food may be carried automatically onto the soil by admixing the falling droplets with a soluble plant food so that the treated droplets will then fall onto the soil carrying some plant food along with the droplet.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An automatic plant watering device comprising:
    at least one thermoelectric module with a hot face and a cold face,
    at least one power supply connected to energize the thermoelectric module providing sufficient power to produce a heat flow in the thermoelectric module to reduce a temperature of the cold face below 32 degrees F.,
    at least one first heat sink thermally connected to the hot face,
    at least one air moving device arranged to provide a flow of air over at least a portion of the at least one first heat sink,
    at least one second heat sink thermally connected to the cold face,
    at least one container filled with a liquid and having thermally conducting walls thermally connected to the second heat sink, with at least one of said walls exposed to ambient air, the container being configured to allow a temperature of the at least one exposed wall to reduce below 32 degrees F. when the thermoelectric module is energized, and the liquid having a freezing temperature sufficiently below 32 degrees F. so as to maintain a liquid state while said thermoelectric module is energized,
    at least one water collection chamber positioned below the at least one exposed wall of the container and configured to hold collected melt water from said at least one exposed wall of the container until a temperature of said collected melt water has risen a desired amount above 32 degrees F.,
    at least one soil moisture sensor probe, and at least one controller configured to control the energization of the at least one thermoelectric module, upon receipt of a signal from the at least one soil moisture sensor probe indicating a level below a desired moisture content of a soil surrounding a plant, for a period of time in excess of an hour to cause the temperature of the at least one exposed wall of the at least one liquid container to be maintained below 32 degrees F. during said period of time, so as to cause a build-up of frost on said at least one exposed wall and thereafter to deenergize the at least one thermoelectric module to permit the temperature of said at least one exposed wall to rise towards ambient temperature.

2. The automatic plant watering device according to claim 1, further including a temperature sensor positioned to sense a temperature of the melt water collected in the water collection chamber.

3. The automatic plant watering device according to claim 1, further including a valve positioned in an outlet of said water collection chamber and controlled by said at least one controller to selectively open and close said outlet.

4. The automatic plant watering device according to claim 1, further including a frost measuring device configured and arranged to measure a thickness of a frost layer on said at least one exposed wall, and to send a signal to said controller when a desired thickness is achieved.

5. The automatic plant watering device according to claim 1, wherein the at least one thermoelectric module comprises two thermoelectric modules energized in parallel.

6. The automatic plant watering device according to claim 1, wherein the controller includes at least one indicator light configured to provide an indication of a state of the automatic plant watering device.

7. The automatic plant watering device according to claim 1, wherein the controller includes user operable inputs for selecting the desired sensed moisture content.

8. The automatic plant watering device according to claim 1, further including thermal insulation arranged between the first and second heat sinks.

9. The automatic plant watering device according to claim 1, further including a housing configured to support the device on a vegetation container.

10. A method for automatically extracting liquid water from air with an automatic plant watering device, comprising:
    providing a soil sensor probe,
    sensing a moisture level of soil adjacent a plant with the soil sensor probe,
    providing a thermoelectric module with a hot face and a cold face,
    providing a controller configured to control the energization of the thermoelectric module upon receipt of a signal from the moisture sensor probe indicating a moisture level below a desired moisture content of the soil,
    connecting a power supply via the controller to energize the thermoelectric module and providing sufficient power to produce a heat flow in the thermoelectric module to reduce the cold face of the thermoelectric module below 32 degrees F.,
    thermally connecting a first heat sink to the hot face,
    thermally connecting a second heat sink to the cold face,
    providing a condensation member in the form of a container filled with a liquid and having thermally conducting walls thermally connected to the second heat sink, with at least one of said walls exposed to ambient air, the container being configured to allow a temperature of the at least one exposed wall to reduce below 32 degrees F. and be maintained below 32 degrees F. when the thermoelectric module is energized, and the liquid having a freezing temperature sufficiently below 32 degrees F. so as to maintain a liquid state while said thermoelectric module is energized,
    thermally conducting the second heat sink to the at least one exposed wall of the container to reduce the temperature of the at least one exposed wall of the container to below 32 degrees F.
    maintaining the temperature of the exposed wall of the container via the controller below 32 degrees F. for more than an hour in order to collect a layer of frost on the at least one exposed wall of the container,
    terminating the energization of the thermoelectric module via the controller to permit the temperature of the at least one exposed wall of the container to rise above 32 degrees F., so that the layer of frost on the wall will become melt water,
    providing a water collection chamber positioned below the at least one exposed wall of the container and configured to hold collected melt water from said at least one exposed wall of the container,
    collecting the melt water in the water collection chamber and retaining the melt water in the water collection chamber until a temperature of the melt water rises towards ambient temperature a desired amount above 32 degrees F., and
    dispensing the collected melt water onto the soil.

11. The method according to claim 10, including sensing a temperature of the melt water collected in the water collection chamber.

12. The method according to claim 11, wherein a valve is positioned in an outlet of said water collection chamber, and further including controlling the valve via the controller to selectively open and close said outlet based on the sensed temperature of the collected melt water.

13. The method according to claim 10, further including measuring a thickness of the layer of frost on said wall and sending a signal to the controller when a desired thickness is achieved.

14. The method according to claim 10, further comprising simultaneously energizing two thermoelectric modules in parallel to reduce temperatures of the at least one exposed wall and another exposed wall of another container.

15. The method according to claim 10, further including energizing at least one indicator light configured to provide an indication of a state of the automatic plant watering device.

16. The method according to claim 10, further including manually inputting a desired sensed moisture level into a controller of the automatic plant watering device.

17. The automatic plant watering device according to claim 1 comprising:
   the at least one thermoelectric module comprising two thermoelectric modules each having a hot face and a cold face,
   the power supply being connected to energize the thermoelectric modules in parallel providing sufficient power to produce a heat flow in the thermoelectric modules to reduce a temperature of the cold faces below 32 degrees F.,
   the at least one first heat sink comprising two first heat sinks, each thermally connected to one of the two hot faces,
   the at least one air moving device comprising two air moving devices, each arranged to provide a flow of air over at least a portion of one of the first heat sinks,
   the at least one second heat sinks comprising two second heat sinks, each thermally connected to one of the two cold faces,
   the at least one container comprising two containers, each filled with a liquid and having thermally conducting walls thermally connected to one of the two second heat sinks, and each having at least one of said walls exposed to the ambient air, each container being configured to allow a temperature of the at least one exposed wall to reduce below 32 degrees F. when the thermoelectric modules are energized, and the liquid having the freezing temperature sufficiently below 32 degrees F. so as to maintain the liquid state while said thermoelectric modules are energized,
   the water collection chamber positioned below the exposed walls of the containers and configured to hold the collected melt water from said exposed walls of the containers,
   a temperature sensor positioned to sense the temperature of the collected melt water collected in the water collection chamber,
   at least one controller configured to control the energization of the thermoelectric modules upon receipt of a signal from the moisture sensor probe indicating the level below the desired moisture content of the soil, for a period of time in excess of the hour to cause the temperature of the at least one exposed walls of the liquid containers to maintained below 32 degrees F. during the period of time, so as to cause h build-up of the frost on said exposed walls and thereafter to deenergize the thermoelectric modules to permit the temperature of said exposed walls to rise towards the ambient temperature, and
   a valve positioned in an outlet of said water collection chamber and controlled by said at least one controller to selectively open and close said outlet,
      the controller including at least one indicator light configured to provide an 36 indication of a state of the automatic plant watering device.

18. The automatic plant watering device according to claim 17, further including a frost measuring device configured and arranged to measure a thickness of a frost layer on said at least one exposed wall, and to send a signal to said controller when a desired thickness is achieved.

19. The automatic plant watering device according to claim 17, wherein the at least one controller includes user operable inputs for selecting a desired sensed moisture content.

* * * * *